(12) United States Patent
Kotwicki et al.

(10) Patent No.: US 6,253,749 B1
(45) Date of Patent: *Jul. 3, 2001

(54) VALVE AND VALVE CONTROL METHOD

(75) Inventors: Allan Joseph Kotwicki, Williamsburg; John David Russell, Farmington Hills, both of MI (US); George Blaha, Morgantown, WV (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/630,386

(22) Filed: Aug. 1, 2000

Related U.S. Application Data

(63) Continuation of application No. 09/227,843, filed on Jan. 11, 1999, now Pat. No. 6,095,123.

(51) Int. Cl.[7] .................................................. F02M 25/07
(52) U.S. Cl. ................................. 123/568.27; 123/568.29
(58) Field of Search ............................ 123/568.11, 568.18, 123/568.19, 568.2, 568.21, 568.26, 568.27, 568.29, 568.3, 518, 519, 520, 676

(56) References Cited

U.S. PATENT DOCUMENTS

| | | | |
|---|---|---|---|
| 3,792,908 | * | 2/1974 | Brewster et al. ................. 303/115.1 |
| 3,834,363 | * | 9/1974 | Goto et al. ....................... 123/568.11 |
| 3,842,814 | * | 10/1974 | Bier ................................. 123/568.29 |
| 4,222,356 | * | 9/1980 | Ueda et al. ...................... 123/568.18 |
| 4,224,912 | * | 9/1980 | Tanaka ............................. 123/568.19 |
| 4,237,837 | * | 12/1980 | Toda et al. ...................... 123/568.18 |
| 4,351,285 | * | 9/1982 | Bradshaw ........................ 123/568.29 |
| 4,366,799 | * | 1/1983 | Suda ................................ 123/568.19 |
| 4,614,184 | * | 9/1986 | Hansen ............................. 123/568.27 |
| 5,213,087 | * | 5/1993 | Sausner et al. ....................... 123/400 |
| 5,277,167 | * | 1/1994 | DeLand et al. ....................... 123/518 |
| 5,373,822 | * | 12/1994 | Thompson ........................... 123/520 |
| 5,448,974 | * | 9/1995 | Toda ..................................... 123/400 |
| 5,515,833 | * | 5/1996 | Cullen et al. .................... 123/568.27 |
| 5,546,915 | * | 8/1996 | Isobe ............................... 123/568.12 |
| 6,095,123 | * | 8/2000 | Kotwicki et al. ............... 123/568.27 |

\* cited by examiner

Primary Examiner—Willis R. Wolfe
(74) Attorney, Agent, or Firm—John D. Russell

(57) ABSTRACT

A vacuum actuated valve uses a specially designed spring having a spring rate as a function of valve position. The spring rate function is determined using physical relationships between flow, pressure, and valve s position. The result is that the relationship between the control input to the valve (either a vacuum signal, or an electrical signal to a vacuum source) and the flow through the valve are linearly related through the entire operating region of the valve.

4 Claims, 4 Drawing Sheets

VALVE AND VALVE CONTROL METHOD

This application is a continuation of U.S. Ser. No. 09/227,843 filed Jan. 11, 1999 now U.S. Pat. No. 6,095,123.

FIELD OF THE INVENTION

The present invention relates to design and control of a vacuum actuated valve for an internal combustion engine.

BACKGROUND OF THE INVENTION

Vacuum actuated valves have long been used in the automotive industry for controlling the flow of various gasses, including exhaust gas recirculation (EGR). EGR systems use the valves for allowing exhaust gas from the exhaust manifold to flow into the intake manifold. Thus, the exhaust gas is recirculated through the engine. Controlling EGR flowis typically used for meeting regulated emissions and maximizing fuel economy. Poor EGR flow control can have detrimental effects, such as engine misfires, engine speed surging, and lost fuel economy.

In particular, good control at low exhaust gas recirculation flow rates is a challenge because of the relationship between the controllable signal sent to the valve and the actual flow through the valve. In one particular system, a vacuum signal is sent to a vacuum actuated valve. The vacuum actuated valve mechanically converts the vacuum signal to a valve pintle position through a spring and diaphragm assembly. The valve pintle then defines the flow area and thus the flow rate of exhaust gasses through the valve and into the engine. Because the pintle is designed to resist sticking and deposit coating, the flow to position characteristics are such that at low openings, a small change in valve position creates a large change in flow. In addition, at high openings, a large change in valve position creates a small change in flow. These relationships cause a high mechanical gain in the feedback control system at low openings. Further; when high gains are coupled with sensors that have delays, with low vacuum command resolution, or with low vacuum command repeatability, all of which are typical in EGR control systems, the result is poor control.

One method of eliminating the problems of poor control at low opening areas is to calibrate the command so that low EGR flow rates are not commanded. This eliminates the control problem by disallowing operating in a certain flow rate region. Another method of improving control of low flow rates would be to increase vacuum control resolution, vacuum control repeatability and sensor bandwidth. This would allow the control system to more accurately maintain a desired low flow rate despite the high gain between control vacuum and EGR flow rate.

The inventors herein have recognized numerous disadvantages with the above approaches. A disadvantage with removing commands of low flow rates is that this eliminates the benefit for which the EGR system is installed on an engine. In other words, there is both a fuel economy and regulated emission benefit for using low flow rates of EGR in certain engine operation regions. A disadvantage with increasing vacuum control resolution, vacuum control repeatability, or sensor bandwidth is that this generally adds cost and is unacceptable.

SUMMARY OF THE INVENTION

An object of the invention claimed herein is to provide an exhaust gas recirculation system with a generally linear relationship between the controlled input and exhaust gas recirculation flow rate across the entire operating region of the system.

The above object is achieved, and problems of prior approaches overcome, by providing a valve for controlling a flow entering and internal combustion engine. The valve comprises a pintle having one end connected to a diaphragm and another end slidably coupled to a seat valve so that flow through said seat valve is related to position of said pintle, a vacuum chamber operatively connected to said diaphragm to move said pintle away from said seat valve, a vacuum source coupled to said vacuum chamber for providing a vacuum thereto in relation to a signal, and a spring operatively coupled to said diaphragm to move said pintle toward said seat valve, said spring having a spring rate as a function of said pintle position such that a relationship between the flow and said signal is linear.

Using a spring with a certain characteristic relationship between spring rate and valve position counteracts the nonlinear relationship that is encountered between control vacuum and EGR flow rate which otherwise occurs when using a conventional spring. Using the relationship between valve position and EGR flow rate, which is determined analytically or experimentally, the relationship between spring rate and valve position is found such that the overall relationship between control vacuum and EGR flow rate is generally linear.

An advantage of the above aspect of the invention is that the feedback control quality is maintained throughout the entire operating region of EGR flow rates.

Another advantage of the above aspect of the invention is that the consistent feedback control quality yields better fuel economy and driveability.

Yet another advantage of the above aspect of the invention is that the consistent feedback control quality yields lower emissions.

In another aspect of the present invention, the above object is achieved, and problems of prior approaches overcome, by providing an exhaust gas recirculation valve for controlling an exhaust gas recirculation amount entering and internal combustion engine, said valve having a non-linear flow relationship between a valve flow and a valve position. The valve comprises a housing portion of the valve having a vacuum port adapted to be connected to a vacuum control line, a vacuum chamber within said housing portion communicating with said vacuum port, having a vacuum volume, and having a vacuum pressure, a vent chamber within said housing portion communicating with atmospheric pressure, a flexible diaphragm having a vacuum side and a vent side, said diaphragm separating said vacuum chamber from said vent chamber, a shaft having a vent end and an orifice end, with said vent end connected to said diaphragm on said vent side of said diaphragm, a pintle located on said orifice end of said shaft, with said orifice position defining a flow rate, and a spring located in said vacuum chamber acting to move said diaphragm in such a way as to increase said volume of said vacuum chamber, with said spring contacting said vacuum side of said diaphragm, said spring having a spring rate dependent on said valve position such that a relationship between said vacuum pressure and said flow rate is linear. In a preferred embodiment, a spring with a relatively large spring rate at low positions and a relatively small spring rate at high positions is used.

An advantage of the above aspect of the invention is that a linear relationship between control vacuum and EGR flow rate is provided when the valve position to EGR flow characteristics are such that at low positions, a small change in position creates a large change in flow and at high positions, a large change in position creates a small change in flow.

Other objects, features and advantages of the present invention will be readily appreciated by the reader of this specification.

BRIEF DESCRIPTION OF THE DRAWINGS

The object and advantages described herein will be more fully understood by reading an example of an embodiment in which the invention is used to advantage, referred to herein as the Description of the Preferred Embodiment, with reference to the drawings wherein.

DESCRIPTION OF AN EMBODIMENT

Figure 1:
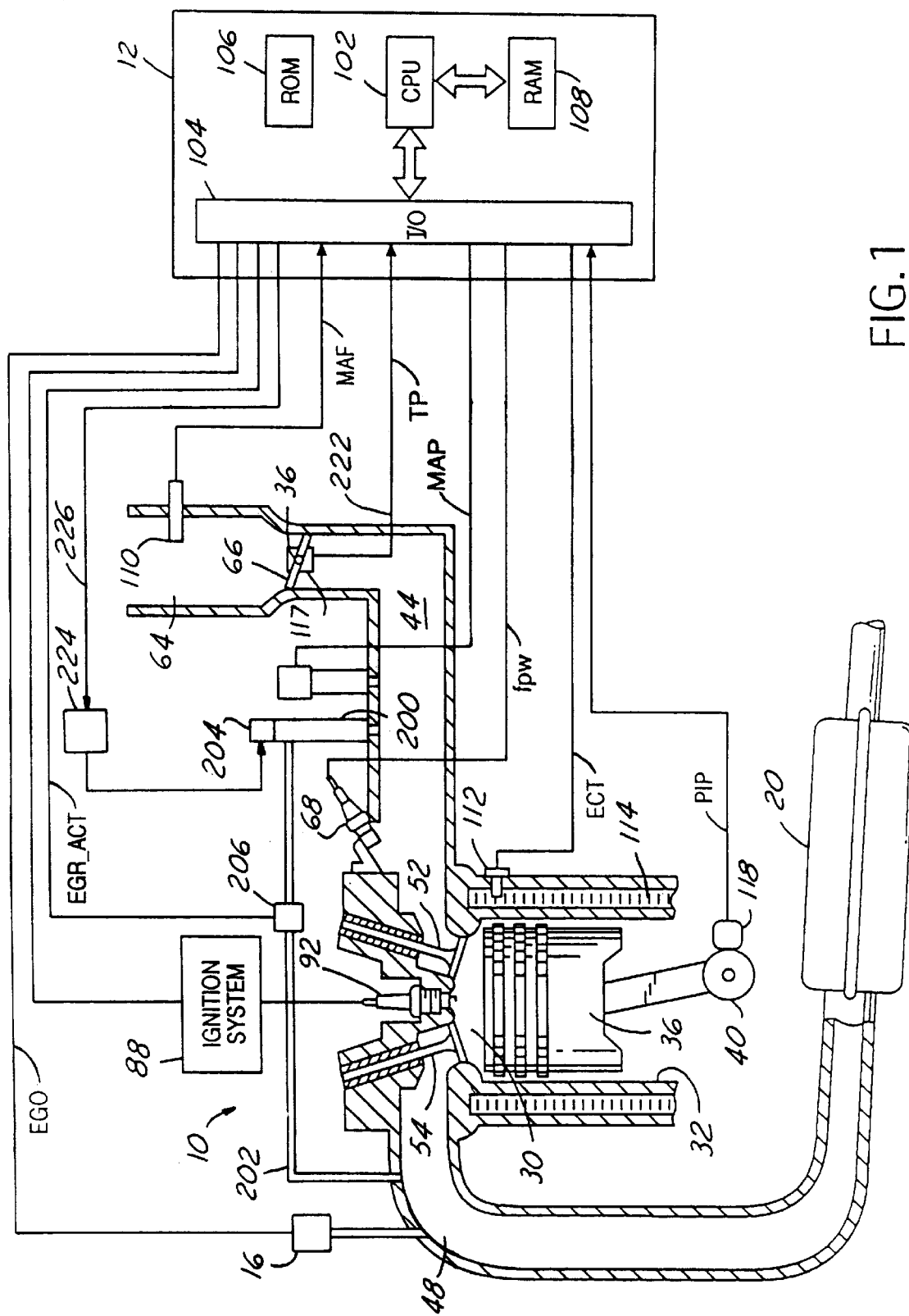
FIG. 1 is a block diagram of an engine in which the invention is used to advantage.

Internal combustion engine 10 comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20.

Intake manifold 44 communicates with throttle body 64 via throttle plate 66. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown). Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of manifold pressure (MAP) from manifold pressure sensor 116 coupled to intake manifold 44; a measurement of throttle position (TP) from throttle position sensor 117 coupled to throttle plate 66; and a profile ignition pickup signal (PIP) from Hall effect sensor 118 coupled to crankshaft 40 indicating and engine speed (N).

Intake manifold 44 communicates with exhaust gas recirculation (EGR) valve assembly 200. Exhaust gas is delivered to intake manifold 44 by a conventional EGR tube 202 communicating with both EGR valve assembly 200 and exhaust manifold 48. Flow Sensor 206 located within EGR tube 202 and provides a measurement of EGR flow, EGR_ACT, to controller 12. In a preferred embodiment, flow sensor 206 uses an upstream and downstream pressure measurement relative to an orifice (not shown) as is known to those skilled in the art and suggested by this disclosure. Vacuum actuator 204 is coupled to EGR valve assembly 200. Vacuum actuator 204 receives vacuum from vacuum source 224 via vacuum tube 228 and vents to the atmosphere (not shown). Vacuum source 224 receives actuation signal (226) from controller 12 for controlling a vacuum pressure level.

Figure 2:
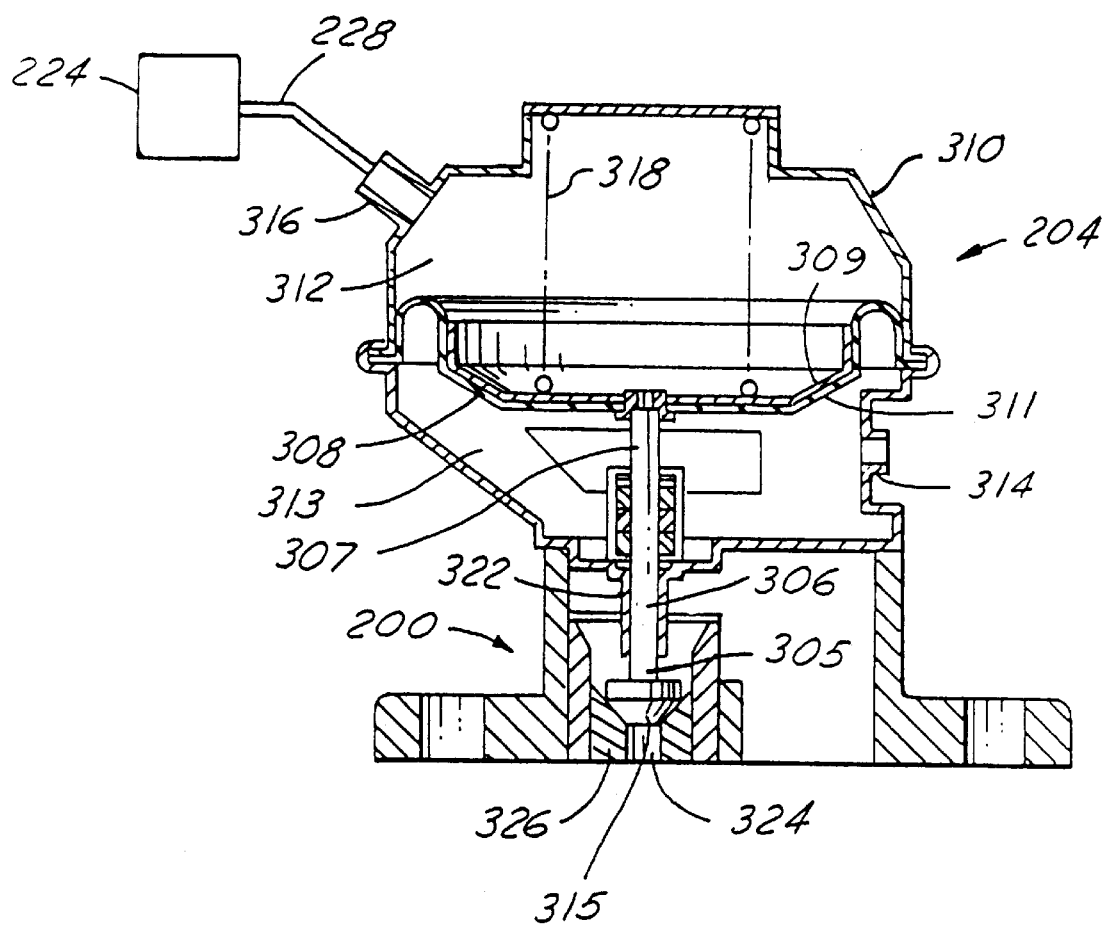
FIG. 2 is a section view of an exhaust gas recirculation valve according to the present invention.

FIG. 2 shows a section view of EGR valve assembly 200 and vacuum actuator 204. Pintle shaft 306, having pintle end 305 and vent end 307, is connected to a rubber diaphragm 308 at vent end 307. Pintle shaft 306 is connected to pintle 315 at pintle end 305. Rubber diaphragm 308 is connected to housing 310, forming vacuum chamber 312 and vent chamber 313. Rubber diaphragm 308 has vacuum side 309 communicating with vacuum chamber 312 and vent side communicating with vent chamber 313. Rubber diaphragm 308 is generally circular in shape with area (A) and tends to seal vacuum chamber 312. Housing 310 has atmospheric vent 314 allowing vent chamber 313 to communicate with the surroundings. Housing 310 also has a vacuum port 316 for allowing vacuum chamber 312 to communicate with vacuum source 224 via vacuum tube 228. Vacuum source 224 receives a control signal 226 (see FIG. 1) from controller 12. Spring 318 cooperates with rubber diaphragm 308 and housing 310. Pintle shaft 306 cooperates with guide 322 for directing motion of pintle 315. Pintle 315 further interferes with EGR flow path 324, either completely, in which case pintle 315 is in contact with seat 326 and has partially compressed spring 318, thereby creating a preload force, or minimally, in which case pintle 315 has completely compressed spring 318, or somewhere in between the two. EGR flow path 324 communicates between EGR tube 202 (see FIG. 1) and intake manifold 44 (see FIG. 1).

Alternatively, rubber diaphragm 308 could be connected to compliant seat 326 with pintle shaft 315 connected to housing 310, and various other combinations known to those skilled in the art and suggested by this disclosure.

According to the present invention, spring 318 is designed with a unique spring rate (K) as a function of compressed distance, or pintle position (x), with said compressed distance measured from the nominal closed position of the valve. In other words, compressed distance (x) is not measured from the spring free length, but from the closed valve position with spring 318 in a preloaded condition. By designing the spring with the unique spring rate, an overall linear relationship is obtained between the controlled input, which in this particular example is a pressure drop across rubber diaphragm 308, controlled by the control vacuum pressure, and the output, which in this particular example is exhaust gas recirculation flow. The analysis by which unique spring rate is determined is now described by way of a detailed example.

The EGR flow (Q) through EGR flow path 324 can be mapped as a function (f) of pintle position (x) for a given pressure drop across pintle 315 as represented by the equation below.

$$Q = f(x)$$

Using a force balance, the total pressure drop across rubber diaphragm 308 (ΔPt) can be related to the pintle position, spring rate, diaphragm area (A), preload force (Fpl), and total spring force (F) as shown in the equation below.

$$(\Delta Pt)^* A = K^* x + Fpl = F$$

The total pressure drop (ΔPt) can be separated into two portions, the preload start to open pressure (ΔPpl) and a remaining pressure drop (ΔPr). In this case, the preload start to open pressure (ΔPpl) will cancel with the preload-force to yield the following equation.

$$(\Delta PT)^* A = K^* x$$

The desired linear relationship is then specified as shown in the following equation, where C represents a coefficient that is a function of the pressure drop across pintle 315. In other words, the slope between the controlled pressure drop (ΔPr) and the EGR flow (Q) will be a function of the pressure drop across pintle 315.

$$Q = C^* \Delta Pr$$

From this, the equations are solved for the spring rate (K) and the only variable parameter is the pintle position (x).

$$K = \frac{A}{C} * \frac{f(x)}{x}$$

As is obvious to those skilled in the art and suggested by this disclosure, this design analysis can be extended to include further relationships, such as, for example, relationships between the controlled pressure drop across rubber diaphragm 308 and electrical control signals from controller 12. In this case, if the there is a relationship between (ΔPr) and a control voltage from controller 12 (V) such as ΔPr= g(V), then the following result is obtained.

$$K = A \frac{g\left(\frac{f(x)}{C}\right)}{x}$$

This will guarantee the unique determination of the spring rate (K) as a function of compressed distance (x) for the system.

Figure 3:
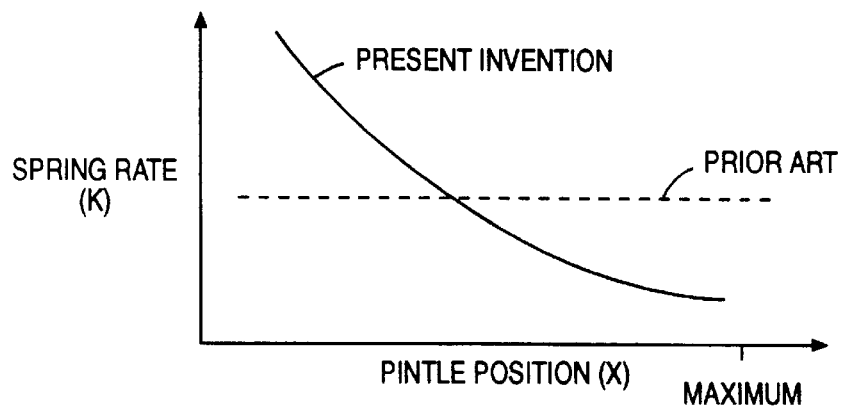
FIG. 3 is a plot showing a preferred relationship between spring rate and valve position according to the present invention.
Figure 4:
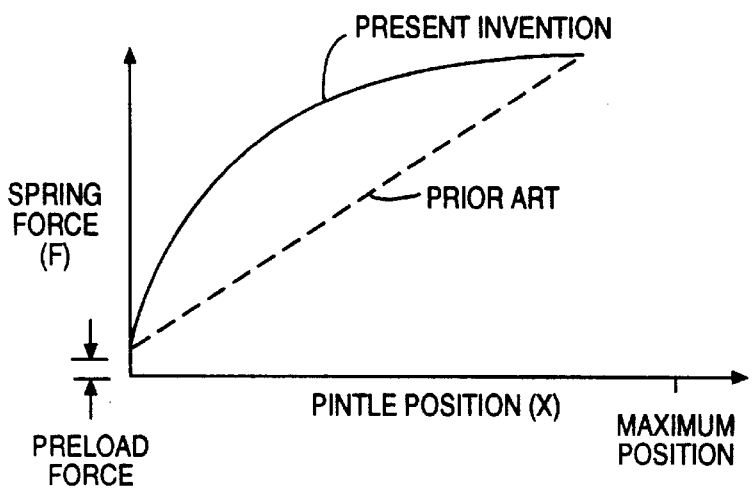
FIG. 4 is a plot showing a preferred relationship between spring force and valve position according to the present invention.
Figure 5:
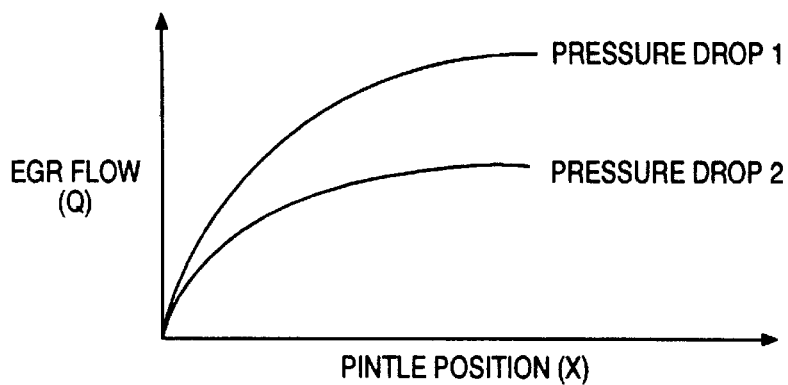
FIG. 5 is a plot showing a typical relationship between pintle position and EGR flow.
Figure 6:
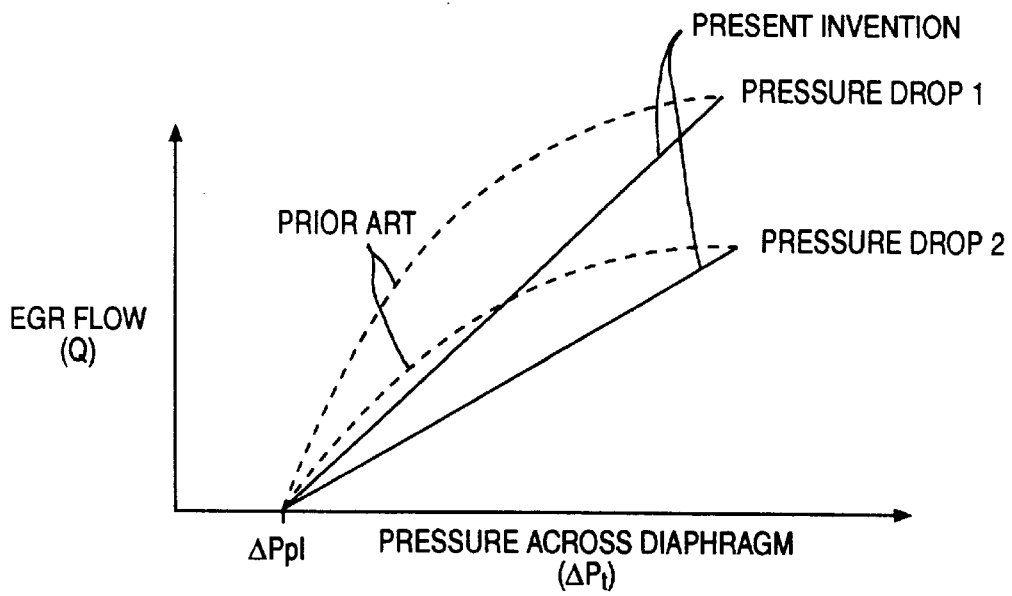
FIG. 6 is a plot showing the resulting relationship obtained between control vacuum pressure and EGR flow by using the present invention.

Referring now to FIGS. 3–6, several relationships are described is for a preferred embodiment. Referring now specifically to FIG. 3, a relationship between spring rate (K) and pintle position (x) is shown for the present invention (solid line) and for prior art (dashed line). In this particular example, the relationship is such that the spring rate is relatively high compared to the average for small values of pintle position, and is relatively low compared to the average for large values of pintle position. Also, the spring rate is monotonically decreasing for increasing pintle position in this example. Finally, the relationship between spring rate (K) and pintle position (x) for this example defines a curve with a concave shape, where the apex of the curve points toward the origin of FIG. 3. Referring now to FIG. 4, a relationship between total spring force (F) and pintle position (x) is shown for the present invention (solid line) and for prior art (dashed line). Referring now to FIG. 5, a relationship, representing function (f) is shown as a function of pintle position (x). The two curves represent two different pressure drops across pintle 315. Referring now specifically to FIG. 6, a relationship between EGR flow (Q) and total pressure drop across rubber diaphragm 308 (ΔPt) is shown for the two different pressure drops across pintle 315 of FIG. 5.

Figure 7:
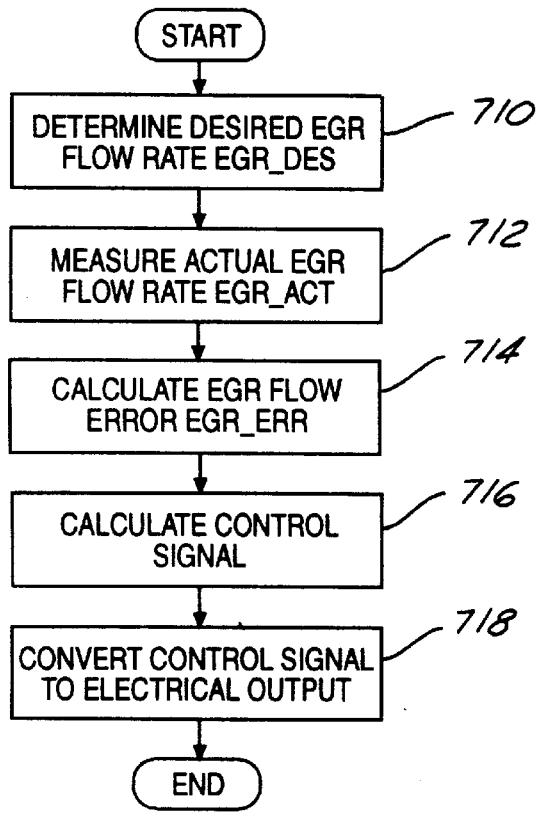
FIG. 7 is a high level flowchart of a routine for controlling EGR flow.

Referring now to FIG. 7, a routine for controlling EGR flow (Q) through EGR flow path 324 is described. In step 710, a desired EGR flow rate (EGR_DES) is determined based on engine operating parameters such as, for example, inducted mass air flow (MAF), engine coolant temperature (ECT), manifold pressure (MAP), throttle position (TP), or engine speed (N). Then, in step 712, the actual EGR flow rate (EGR_ACT) is determined based on a measurement of flow sensor 206. In step 714, the EGR flow error (EGR_ERR) is calculated as the difference between EGR_DES and EGR_ACT. Next, in step 716, a control signal is calculated based on EGR flow error (EGR_ERR). The control signal is preferably calculated using a proportional and integral controller. Finally, in step 718, the control signal is converted to an electrical output signal which is sent by controller 12 to vacuum actuator 204 for controlling the pressure drop across diaphragm 308.

This concludes the description of the Preferred Embodiment. The reading of it by those skilled in the art would bring to mind many alterations and modifications without departing from the spirit and scope of the invention. For example, the present invention can be embodied in many other types of vacuum actuated valves, such as, for example, purge vapor valves. In addition, many different relationships may exist between flow and pintle position and between controller output voltage and pressure drop across a diaphragm. Following the analysis presented here, a relationship between spring rate as a function of pintle position can be found such that the relationship between the controlled input and the output flow is linear. Accordingly, it is intended that the scope of the invention be limited by the following claims.

We claim:

1. A valve for controlling a flow entering an internal combustion engine, said valve comprising:

a pintle having one end connected to a diaphragm and another end slidably coupled to a seat valve;

a vacuum chamber operatively connected to said diaphragm to move said pintle away from said seat valve;

a vacuum source coupled to said vacuum chamber for providing a vacuum thereto in relation to a signal; and a spring operatively coupled to said diaphragm to move said pintle toward said seat valve, said spring having a spring rate as a function of said pintle position wherein said spring rate decreases as said pintle position increases.

2. The valve as recited in claim 1, wherein said seat valve communicates with an intake manifold and an exhaust manifold of the internal combustion engine.

3. The valve as recited in claim 1, wherein said flow is an exhaust gas recirculation flow.

4. The valve as recited in claim 1, wherein said signal is a vacuum signal.

* * * * *